(12) United States Patent
    Young

(10) Patent No.: US 12,646,667 B2
(45) Date of Patent: Jun. 2, 2026

(54) MODIFIED TACTILE INPUT ATTACHMENT AND DEVICE

(71) Applicant: Tippy Type LLC, Chicago, IL (US)

(72) Inventor: Sara Young, Chicago, IL (US)

(73) Assignee: Tippy Type LLC, Chicago, IL (US)

( * ) Notice: Subject to any disclaimer, the term of this patent is extended or adjusted under 35 U.S.C. 154(b) by 164 days.

(21) Appl. No.: 18/443,519

(22) Filed: Feb. 16, 2024

(65) Prior Publication Data

US 2025/0266221 A1 Aug. 21, 2025

(51) Int. Cl.
    *H01H 13/86* (2006.01)
    *G06F 3/02* (2006.01)
    *H01H 13/04* (2006.01)
(52) U.S. Cl.
    CPC ........... *H01H 13/86* (2013.01); *G06F 3/0202* (2013.01); *H01H 13/04* (2013.01)
(58) Field of Classification Search
    CPC ....... H01H 2003/127; H01H 2217/042; H01H 2223/003; H01H 13/04; H01H 13/84; H01H 2223/044; G06F 3/0216; G06F 3/0219
    See application file for complete search history.

(56) References Cited

U.S. PATENT DOCUMENTS

| | | | | |
|---|---|---|---|---|
| 4,940,346 A | * | 7/1990 | Liljenquist | B41J 5/10 400/486 |
| 5,201,594 A | * | 4/1993 | Adinolfi | B41J 5/12 400/490 |
| 5,391,006 A | | 2/1995 | Danziger | |
| 2007/0258747 A1 | | 11/2007 | Caplan | |
| 2015/0270076 A1 | * | 9/2015 | Katsuhara | G06F 3/02 428/141 |

OTHER PUBLICATIONS

International Search Report & Written Opinion relating to PCT/US2024/037549 filed Jul. 11, 2024; Mail Date: Oct. 9, 2024.

* cited by examiner

*Primary Examiner* — Nathan Milakovich
(74) *Attorney, Agent, or Firm* — Dinsmore & Shohl LLP

(57) ABSTRACT

Systems, methods, and other embodiments associated with a modified tactile input attachment and device are described. In one embodiment, the modified tactile input may be a keyboard cover that includes an operator side having a plurality of keycap regions with each keycap region having a vertical structure. The keyboard cover further includes a device side having a plurality of keyplate regions that vertically align with and correspond to each of the plurality of the keycap regions. The keyplate regions may be configured to contact and receive a key of a keyboard.

20 Claims, 6 Drawing Sheets

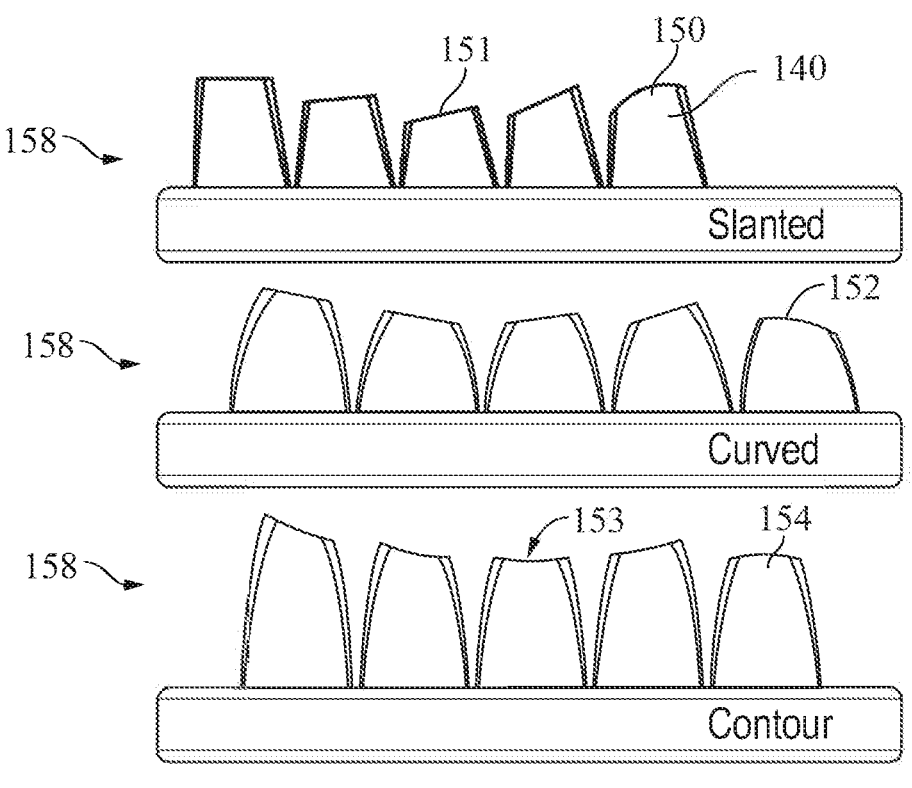

710
Forming one or more vertical structures on a first surface of a substrate, the first surface having one or more keycap regions 720
Forming one or more surface features on a second surface of the substrate, the second surface having one or more keyplate regions 730
Forming one or more indentations and/or protrusions as surface features, each of the one or more indentations and/or protrusions being disposed in each of the one or more keyplate regions of the second surface of the substrate

FIG. 7

MODIFIED TACTILE INPUT ATTACHMENT AND DEVICE

TECHNICAL FIELD

The embodiments generally relate to modified tactile input devices, and more particularly, relates to attachments, covers, fittings, housings, and devices for facilitating operation of tactile input devices.

BACKGROUND

Many electronic devices receive input and operational feedback through a tactile input device such as a keyboard having a panel of physical keys designed for operating the device and entering data. Generally, keyboards have a number of keys disposed on a panel, the keys are adjacent to one other with a springy or mechanical feedback to provide tactile response and comfort for short or prolonged periods of use. For many tactile input devices, typists and operators may be trained to place their fingers in particular sections or quadrants of the input device. For example, in training users with a standard keyboard for computing devices, instructors train users to use a standard QWERTY finger placement, to distribute key operations efficient between the left and right hands. In doing so, it becomes natural for users to arch their hands and place their fingertips directly on the keys to facilitate speed and accuracy.

Because finger placement is important for speed and accuracy, use of keyboards often becomes uncomfortable for users with long fingernails, hand or wrist sensitivity, limited mobility, pain, or health conditions such as arthritis and carpal tunnel syndrome, and others, due to higher or lower arching of user hands (or other unnatural or uncomfortable hand arching) to accommodate keyboards. Moreover, to increase the portability of keyboards such as, for example, laptops and other tactile input devices, key distances and elevation have been reduced, for example, a laptop keyboard is flatter and more compact compared to many standalone keyboards, requiring users of all types to adjust how they type. Keyboards of all types can be difficult and/or uncomfortable for users with long fingernails, hand or wrist sensitivity, pain, or health conditions as users may need to adjust their hands to type effectively. Users with long fingernails often strain their hands and wrists so as to avoid damaging their natural or artificial nails as their fingernails would otherwise strike rigid or uneven surfaces of adjacent keys or the keyboard panel itself while typing. For keyboard users, typing by using their fingernail itself can be challenging to press keys as the nail edge is itself an uneven striking surface compared to a fingertip and this can cause damage and pain. Moreover, for many users, even those without long nails or health issues, tactile response and sensation, which contribute to comfortable and accurate input or typing, can often be lacking with flat or rigid keys and rigid keyboard surfaces.

For these reasons, many users may avoid having long fingernails so that they can type well and comfortably on keyboards. Other users with nails or other issues such as limited mobility or other health issues may avoid prolonged use due to discomfort from manipulation of hands to type on keyboards, or to avoid damaging their nails by striking rigid surfaces. Further, many users without nails or other issues may prefer a better tactile response from laptop and standalone keyboards. Therefore, it would be advantageous for users of many kinds to have a way to type on a keyboard that allows for greater speed, accuracy, and a comfortable and natural finger position or natural hand arch.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be implemented as multiple elements or that multiple elements may be implemented as one element. In some embodiments, an element shown as an internal component of another element may be implemented as an external component and vice versa. Furthermore, elements may not be drawn to scale. A complete understanding of the present embodiments and the advantages and features thereof will be more readily understood by reference to the following detailed description when considered in conjunction with the accompanying drawings wherein:

FIG. 3C illustrates a perspective and bottom view of one embodiment of a single key tactile input device cover illustrating an example vertical structure and surface features of the tactile input device cover;

FIG. 3D illustrates a perspective and bottom view of one embodiment of a group key tactile input device cover illustrating example vertical structures and surface features of the tactile input device cover;

FIG. 3E illustrates a perspective and bottom view of one embodiment of a single key tactile input device attachment for replacing a key of a keyboard, and further illustrating an example vertical structure of the tactile input device attachment;

FIG. 6 illustrates a cross sectional view of various embodiments for a tactile input key profile that may be used with the example covers, attachments, and/or devices disclosed; and FIG. 7 illustrates one embodiment of a method for forming a tactile input attachment that may be used with the example attachments and/or devices disclosed.

DETAILED DESCRIPTION

Figure 1:
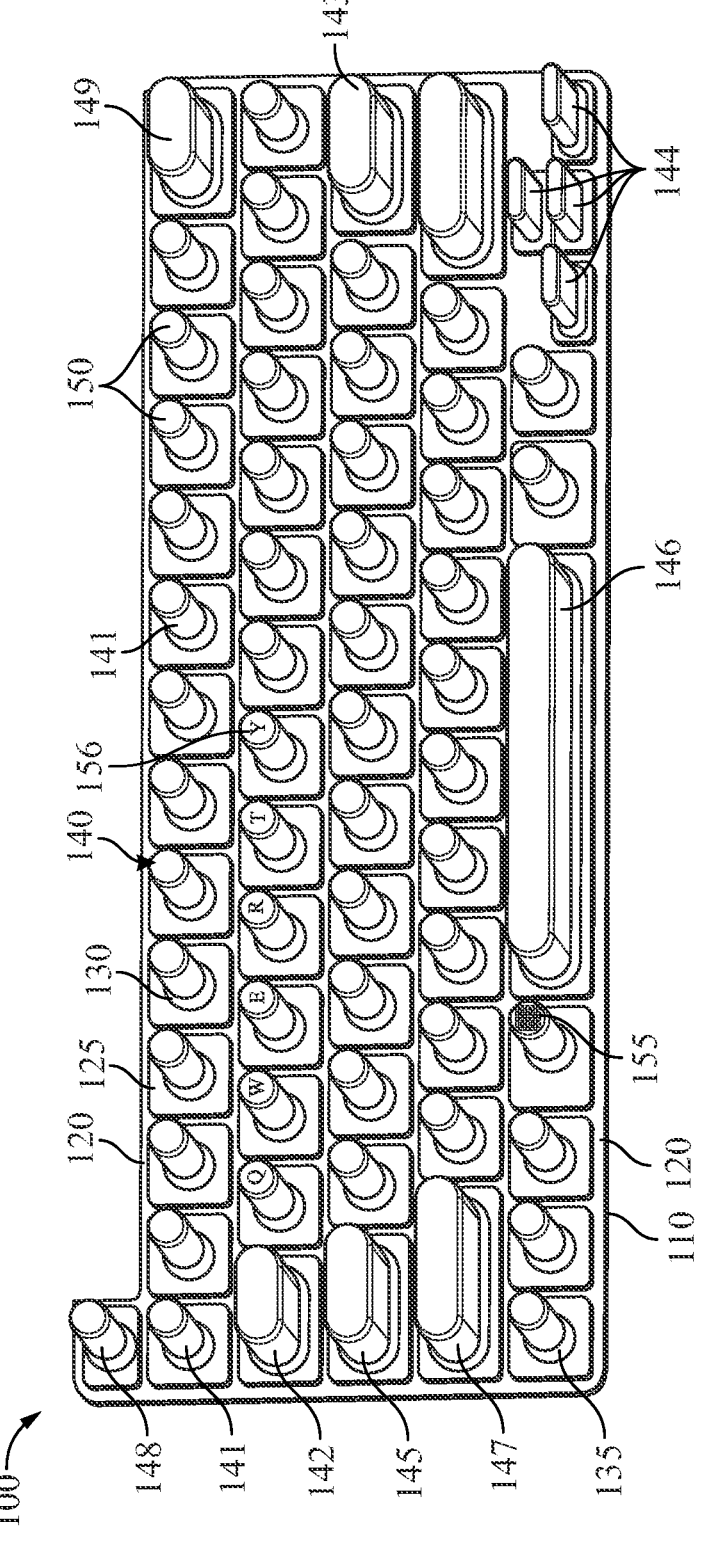
FIG. 1 illustrates a front plane view of one embodiment of an operator's side of a tactile input device cover configured to provide comfort and tactile response and sensation for a keyboard.

Devices and methods are described herein as associated with tactile input keys configured to provide comfort and tactile response and sensation, in one embodiment. The tactile input keys may include spaced out vertical structures that extend vertically from the keyboard panel to facilitate speed, accuracy, and comfort. Tactile input keys may be configured for various sized and shaped hands, fingers, fingernails, hand and finger arches, hand or finger sensitivities, or keyboard feedback preferences. The size, shape, materials, and curvature of each vertical structure for each tactile input key may be configured as needed or desired to facilitate greater comfort, typing effectiveness, or purely for aesthetic purposes. In one embodiment, the tactile input keys may be raised keys, centrally positioned above a keyboard key, and spaced apart from each other to facilitate adequate clearance for user's natural hand and finger arches.

In one embodiment, the input keys may be made of soft silicone material, or other soft, flexible, or semi-rigid materials and textures so that any incidental contact of, for example, a long fingernail will not be as painful or damaging as it would be for a hard surface. Moreover, the tactile input keys may be selected from any soft or pliable material to reduce strain and pressure on a user's finger, nail bed, or nail decoration. In one embodiment, the tactile input keys may be implemented as a keyboard cover that overlays the keyboard of a computing device. The tactile input keys enable users to comfortably type with the natural curvature of their fingers on input keys, the input keys may be configured as need to provide clearance, spacing, and tactile comfort, as described herein.

In one embodiment, the tactile input keys may be integrally formed on a keyboard attachment. The keyboard attachment may be a keyboard assembly or keyboard part configured to replace an existing keyboard part on the computing device. The keyboard attachment may be attached to a computing device such as a laptop to replace the existing keyboard.

In certain embodiments, one or more pillars may include light sources such as light emitting diodes (LEDs) to facilitate use in low light conditions, improved visualization of keys for user accessibility, and a customizable key appearance. In some embodiments, the pillars may be configured to include touch sensors to allow users to lightly touch or press on the pillars to effectuate a keypress. In one embodiment, the keyboard, keyboard cover, or keyboard attachment may provide haptic feedback through one or more transducers, microcontrollers, ultrasonic sensors, ultrasound transducers, eccentric rotating mass (ERM) actuators, linear resonant actuators (LRA), piezoelectric actuators, or other technology.

Previous tactile input devices are difficult, inconvenient, or painful for users with long fingernails, hand or wrist sensitivity, pain, or health conditions such as arthritis and carpal tunnel syndrome, for example. Regardless of the tactile input device, users prefer natural hand and finger arches that allow fingers to rest naturally on the device, allowing the fingertips themselves to strike the keys. Users with long fingernails prefer natural hand and finger arches, but instead have to unnaturally adjust their fingers in order to type effectively. Moreover, users with long fingernails may strike adjacent keys or the keyboard panel which causes upward force on the fingernails causing pain to the user's fingers and damage to their fingernails. Existing keyboards, for example on laptops and other computers, are less than ideal as typing speed and accuracy suffers, and one's hands are strained over time by unnatural and uncomfortable finger positioning. Moreover, keyboard and other tactile input device designs require users to have stiff fingers and short nails for continued use, which can often be inconvenient or uncomfortable for users to accommodate. For these reasons, many users may avoid having long fingernails to be able to type well and comfortably on a keyboard. For users with hand or wrist sensitivity, pain, or health conditions such as arthritis and carpal tunnel syndrome, existing tactile input devices require them to alter their finger and hand position or hand arch which makes it difficult or painful to type for an extended period.

With the present modified tactile input attachment and device, input keys are spaced out vertically raised structures to facilitate more accuracy, speed, and comfort. The base of each input key may include a collar with an angled edge to provide stability. The input keys may be configured to have a flat or concave top surface as desired for comfort. This simulates the tactile feel of typing on a desktop keyboard while using a laptop. The input keys allow users of all types to comfortably type with the natural curvature of their finger or hand, without the need, for example, for short nails or stiff fingers. Further, a keyboard cover is provided with vertically raised and spaced-out input keys for users that prefer raised keys on their flat-keyed keyboard or laptop. In one embodiment, the base of each input key includes one or more surface features for securing each input key of the modified tactile input attachment and device to each keyboard key. That is, the base of the input key fits neatly and snugly over the top of a key of a keyboard, such that the cover stays in place while typing. In one embodiment, the surface feature may include indentations for receiving a key of a keyboard. In certain embodiments, the surface feature may include one or more protrusions for facilitating a keypress on a keyboard. In some embodiments, the surface feature formed underneath the base of the keyboard cover may include one or more protrusions that form a perimeter in the shape of a key of a keyboard, whereby each surface feature positioned underneath the base of the keyboard cover may receive and sleeve over each key of the keyboard. As an example, for a keyboard cover with the present modified input keys, one or more surface features may be implemented to tightly fit on a keyboard, keyboard panel, or keyboard keys to minimize movement of the keyboard cover. Thus, the keyboard cover and attachment may be configured for many keyboard configurations of different laptop or desktop keyboards.

Moreover, many users prefer the tactile feel of keyboards with raised keys such as those used in desktop or standalone computers. Using a keyboard cover with the present modified input keys, existing keyboards with flat keys may be modified to have raised keys thereby providing a typing experience closer to that of a desktop keyboard. Further, the height of the raised input keys may be adjusted as desired to accommodate different nail lengths, hand, or finger arches, and typing preferences. Moreover, the input keys may be manufactured of a soft silicone material which is highly flexible and easy to use. These and other features are described herein with reference to the attached figures.

Keyboard Cover Embodiment

Figure 2:
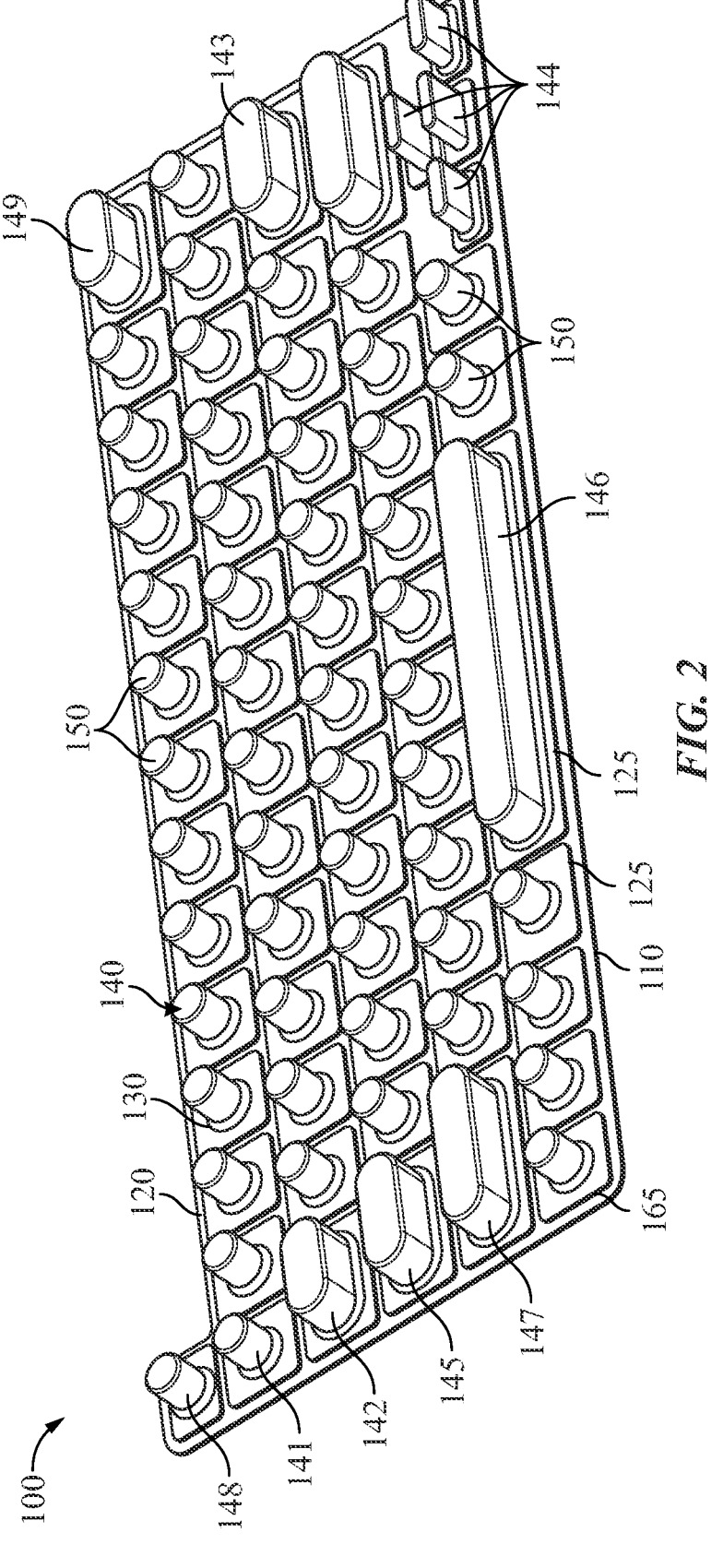
FIG. 2 illustrates a perspective view of one embodiment of the operator's side of the tactile input device cover of FIG. 1 showing the spacing and features of the tactile input device cover.

With reference to FIGS. 1-2, one embodiment of an operator's side of a tactile input device cover is illustrated that is configured with raised cylindrical input keys to provide comfort and tactile response and sensation. While vertical structures having numerous dimensions, sizes, colors, materials, and shapes may be contemplated and easily implemented for operator surface features and input keys, in FIG. 1 and the examples described below, the vertical structures are configured to be raised cylindrical and rectangular input keys illustrated and described should not be interpreted as limiting the scope of the present disclosure to a particular dimension, shape, color, material, or size for a raised input key. In one embodiment, the input device cover may be a keyboard cover. Referring to FIG. 1, the keyboard cover 100 includes a base 110 having an input surface 120, raised keys 140 with key surfaces 150, and a base collar 130 positioned between the input surface 120 and the key surfaces 150.

As an example, the keyboard cover 100 may include a plurality of cylindrical and rectangular input keys 140 on the input surface 120 with the input keys 140 being centrally positioned in a keycap region 125 corresponding to each keyboard key surface. Referring to FIG. 2, a base collar 130 may be formed around each input key 140 to provide durability and stability of the input key 140. In one embodiment, the base collar 130 may be of the same shape as the input key 140 and wrap around the input key 140 with a smooth contoured edge. In certain embodiments, the base collar 130 may include an angled edge 135 to provide a comfortable tactile sensation and feel. The angled edge 135 of the base collar 130 may be between 5 degrees to 90 degrees from the vertical surface of the input key 140. In certain embodiments, the base collar 130 may be made, in part or in whole, of stiff or semi-rigid materials, plastics, or polymers to enhance stability and durability. The keyboard cover 100 may provide raised input keys 140 for each of the keys of a keyboard, the raised input keys may be configured to have a variety of shapes and sizes, for example, circular shape character keys 141, power key 148, and escape key 149, rectangular shaped keys for tab key 142, return key 143, navigation and arrow keys 144, caps lock key 145, space bar key 146, shift key 147.

In one embodiment, the input keys 140 may be vertical structures that extend vertically from the input surface 120, one or more input keys 140 may extend to a height of between 0.10 inches to 2.00 inches from the input surface 120. As shown in FIGS. 1-2, the input keys 140 may extend orthogonally from the input surface 120 or at various angles to provide a contoured key layout as shown in FIG. 6. In certain embodiments, the input key surface 150 may be correspondingly beveled, protruding, slanted, or concave to facilitate tactile comfort and sensation as desired. The base 110, input surface 120, base collar 130, base collar angled edge 135, input key 140, or input key surface 150 may be made of a soft material such as silicon, plastic, plastic polymer, HPDE (High-Density Polyethylene), LDPE (Low-Density Polyethylene), fabrics, and the like. In some embodiments, the keyboard cover 100 may be configured to have different colors, transparencies, or textures to facilitate visual and tactile feel, sensation, or comfort. For example, base 110, input surface 120, base collar 130, base collar angled edge 135, input key 140, or input key surface 150 may be made of a clear or colored transparent material to allow light sources such as light emitting diodes (LEDs) emanating from the computing device keyboard panel to: provide a visual of each key in low light conditions, improve visualization of keys for user accessibility, or provide user customization for a desired look or appearance. In certain embodiments, the input key surface 150 may have a micro-dimpled texture 155 to facilitate tactile comfort and feel. In one embodiment, the input key surface 150 may include beveled characters 156 matching that of the keys on the keyboard. In certain embodiments, the input key surface 150 may include raised dots similar to the micro-dimpled texture 155 to facilitate braille for visually impaired users. Moreover, each input key 140 may be shaped as desired to vertically extend from the input surface 120 in the shape of, for example, a heart, a fruit, a polygon, a circle, a star, a non-fictional character, a fictional character, a letter, a number, an emoji, a flower, a plant, or any combination thereof.

Figures 3A, 3B:
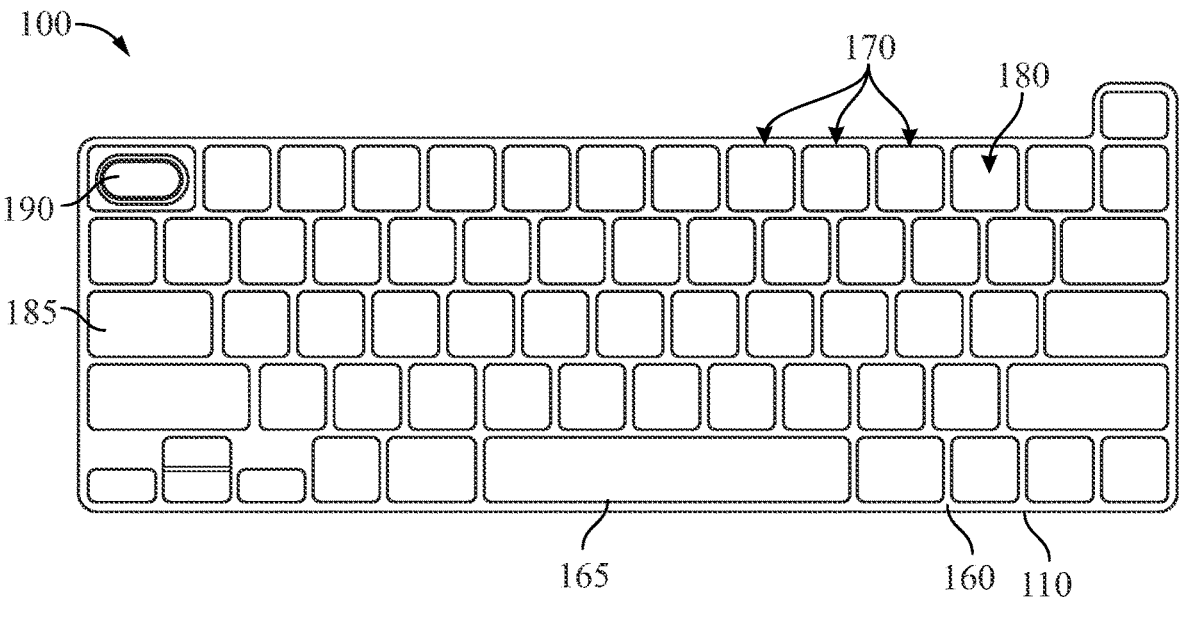
FIG. 3A illustrates a back plane view of one embodiment of a device side of the tactile input device cover of FIG. 1 illustrating notch surface features of the tactile input device cover.
FIG. 3B illustrates a back plane view of one embodiment of a device side of the tactile input device cover of FIG. 1 illustrating protrusion surface features of the tactile input device cover.

With reference to FIG. 3A, one embodiment of a device side of the tactile input device cover of FIG. 1 is illustrated that is configured with surface features for securing the cover to the keys of an input device and/or facilitating a key press on the input device. The key covers and surface features described in FIGS. 3A-3B should not be interpreted as limiting the scope of the present disclosure to a particular key cover or surface feature dimension, shape, color, material, or size for securing a tactile input device cover and/or facilitating a key press on an input device. The key covers and/or surface features may be configured to provide for input device keys of varying heights, shapes, curvatures, and dimensions for keyboard modifier keys, alpha keys, numpad keys, navigation and arrow keys, and function keys, for example.

Referring to FIGS. 3A-3B, the keyboard cover 100 includes a base 110 having a device surface 160, keyplate regions 165 having square and/or rectangular key covers 170 configured to include surface features 180 for receiving, grasp, securing, or sleeving over a key of an input device. The key covers 170 may vertically align with and receive, grasp, secure, or sleeve over the keys of an input device. In some embodiments the key covers 170 may vertically align with keycap regions 125. In some embodiments, each of the plurality of keyplate regions 165 vertically align with and correspond to each of the plurality of the keycap regions 125. The plurality of keyplate regions 165 may be configured to contact and receive each key of a keyboard. In certain embodiments, the key covers 170 and/or surface features 180 may be made, in part or in whole, of stiff or semi-rigid materials, plastics, or polymers to enhance stability and durability.

In one embodiment, surface feature 180, may sleeve over and cover certain fixture points of the keyboard, for example, the space bar, the shift key, power key, and escape key may act as securing points to hold the keyboard cover 100 in place during use. The surface features 180 may be configured to be square, rectangular, or other shapes as needed to receive, sleeve over, grasp, or secure onto the keys of a keyboard. The surface features 180 may be made of a soft material such as silicon, plastic, plastic polymer, HPDE (High-Density Polyethylene), LDPE (Low-Density Polyethylene), fabrics, and the like. In some embodiments, surface features 180 may be configured to have different colors, transparencies, or textures to facilitate visual and tactile feel, sensation, or comfort.

Referring to FIG. 3A, the surface features 180 may include one or more indentations 185 that extend vertically into the device surface 160 of base 110 to a height of between 0.01 inches to 1.50 inches. Moreover, the base 110 may include a plurality of indentations 185 with each indentation being positioned in a keyplate region 165. In one embodiment, one or more the indentations 185 may extend into and above the input surface 120 to receive a key of an input device. In certain embodiments, one or more of the indentations 185 may extend at a non-orthogonal angle into the device surface 160.

Referring to FIG. 3B, the surface features 180 may include one or more protrusions 190 that extend vertically outwards from the device surface 160 of base 110 to a height of between 0.01 inches to 1.50 inches. Moreover, the base 110 may include a plurality of protrusions 190 with each protrusion being positioned in a keyplate region 165. In one embodiment, one or more of the protrusions 190 may form a perimeter around each keyplate region to receive and secure a key of the input device. In certain embodiments, one or more of the protrusions 190 may extend outwards at a non-orthogonal angle from the device surface 160. In one embodiment, the keyplate region 165 may include one or more indentations 185 to sleeve over and secure keys of a keyboard to the device surface 160 and one or more protrusions 190 in the keyplate region 165 to reduce the distance or pressure needed to communicate a keypress to the keyboard. In some embodiments, a protrusion 190 may be positioned inside the indentations 185. In one embodiment, a plurality of protrusions 190 may be formed around a perimeter of the keyplate region 165 with indentations 185 inside the keyplate region that together form the key cover 170 that grasps and secures a key of the keyboard.

In certain embodiments, a combination of one or more surface features 180 may be implemented. For example, in certain keyplate regions 165 one or more protrusions 190 may be more effective for securing the base 110 to the input device while indentations 185 may be used in other keyplate regions 165 to secure the base 110 to the input device. Further, in some embodiments, the device surface 160 may be secured to a printed circuit board (PCB), plate, or housing of a keyboard. In certain embodiments, one or more indentations 185 or protrusions 190 may be used to facilitate tactile feel and sensation.

Keyboard Attachment Embodiment

Figures 3C, 3D, 3E:
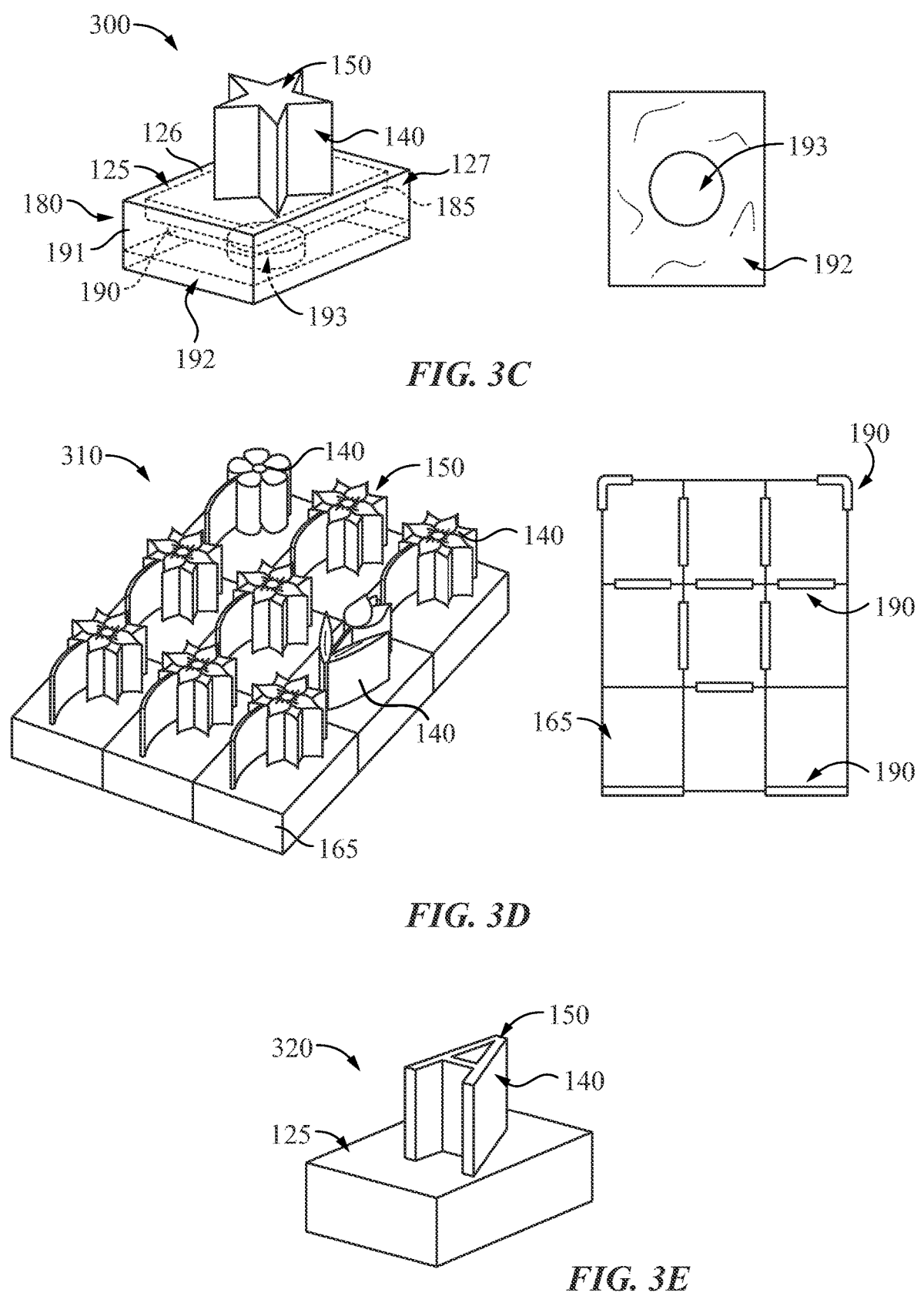

FIG. 3C illustrates one embodiment of a tactile input device cover having an example vertical structure and surface features and configured for attaching to an input key of a tactile input device. As an example, the tactile input device may be a keyboard, and the tactile input device attachment may be configured to cover, wrapped around, or secure to a keyboard key. In one embodiment, the keyboard attachment 300 may be a single key cover configured for receiving and sleeving over a keyboard key. The keyboard attachment 300 may include raised keys 140 with key surfaces 150 as described herein, with each raised key 140 configured to be integrally formed on a keycap region 125 to facilitate a unitary keyboard attachment 300. In some embodiments, the raised input keys 140 may include a base collar 130 as describe herein. In one embodiment, the raised keys 140 may form vertical structures in the shape of a star.

Further, the keycap region 125 may include an upper surface 126 (corresponding to an input surface 120) and an adjacent peripheral surface 127. In one embodiment, the peripheral surface 127 may include a single surface that wraps around the perimeter of the upper surface 126. In many embodiments, the peripheral surface 127 may include a plurality of walls 191. The peripheral surface 127 may be configured as desired to receive and sleeved over the keyboard key. As shown in FIG. 3C, the peripheral surface 127 includes a plurality of walls 191, each wall may have a height of between 0.10 inches to 1.50 inches to receive a key of the keyboard. Further, the interior space of the keycap region 125 may be defined by one or more surface features 180, for example, one or more indentations 185 or protrusions 190, or other surface features that can facilitate a key press and/or securing of the keyboard attachment 300 to a keyboard key. Moreover, the bottom surface of the keycap region 125 (corresponding to a device surface 160) may include a retaining surface 192 and opening 193. The upper surface 126, peripheral surface 127, surface features 180, retaining surface 192, and opening 193 of the keycap region 125 may be configured as needed to receive and secure a keyboard key to the keyboard attachment 300.

FIG. 3D illustrates one embodiment of a tactile input device attachment configured for attaching to multiple input keys of a tactile input device. As an example, the tactile input device attachment may be configured to attach to a group of input device keys, a plurality of adjacent keys, a plurality of keys on an upper, lower, left, or right section of a keyboard, or the like. In one embodiment, the keyboard attachment 310 may be a single key cover configured for receiving and sleeving over a numpad keys of a keyboard. The keyboard attachment 310 may include raised keys 140 with key surfaces 150 as described herein, with each raised key 140 configured to be integrally formed on a keycap region 125 to facilitate a unitary keyboard attachment 310. Further, the keycap region 125 may include an upper surface 126 (corresponding to an input surface 120) and an adjacent peripheral surface 127, as described herein. FIG. 3D illustrates one or more protrusions 190, where each of the one or more protrusions 190 may be positioned on each of the one or more keyplate regions 165. In one embodiment, the protrusions 190 may extend horizontally outwards from the perimeter of the key regions 165 to define the opening 193 and form a plurality of retaining surfaces 192. In one embodiment, the retaining surface 192 may a layer having a thickness of between 0.01 inches to 0.50 inches. In one embodiment, the protrusions 190 may extend horizontally and vertically outwards from the perimeter of the key regions 165 to provide a more rigid or durable surface feature 180 for receiving and securing keyboard keys to the keyboard attachment 310. In one embodiment, the raised keys 140 may form vertical structures in the shape of a different flowers.

FIG. 3E illustrates one embodiment of a tactile input device attachment configured for replacing an input key of a tactile input device. As an example, the tactile input device may be a keyboard, and the tactile input device attachment may be configured to be a physical keycap, key, or button that replaces a corresponding keycap, key, or button of a keyboard. In one embodiment, the keyboard attachment 320 may be a single key configured for attaching to a key retainer or keyboard PCB to replace a keyboard key, keycap, or button. In one embodiment, the keyboard attachment 320 may include raised keys 140 with key surfaces 150 as described herein, with each raised key 140 configured to be integrally formed on a keycap region 125 to facilitate a unitary keyboard attachment 320. In some embodiments, the raised input keys 140 may include a base collar 130 as describe herein. Further, the keycap region 125 may include an upper surface 126 (corresponding to an input surface 120) and an adjacent peripheral surface 127. In one embodiment, the peripheral surface 127 may include a single surface that wraps around the perimeter of the upper surface 126. In many embodiments, the peripheral surface 127 may include a plurality of walls 191 as described herein. In one embodiment, the raised keys 140 may form vertical structures in the shape of a letter. As described above in FIG. 3D for a group of key covers, a multiple key tactile input device attachment may also be configured and used as desired for replace one or more keyboard key groups.

Figure 4:
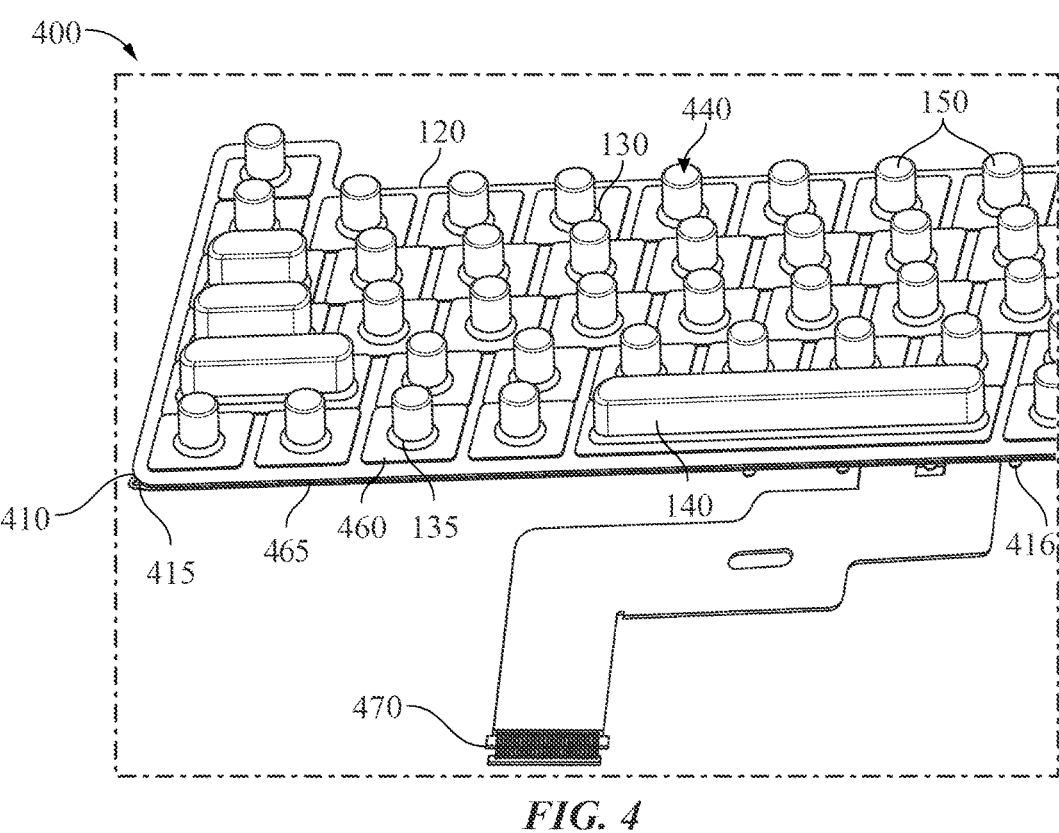
FIG. 4 illustrates a perspective view of one embodiment of a tactile input device attachment.

With reference to FIG. 4, one embodiment of a tactile input device attachment is illustrated that is configured for attaching to a keyboard panel or keyboard PCB of a computing device. In one embodiment, the tactile input device may be a keyboard attachment configured to be attached into a computing device as a keyboard assembly or part to replace an existing keyboard. In one embodiment, the keyboard attachment 400 may be a standalone tactile input device configured to be installed into a computing device.

The keyboard attachment 400 may include a plurality of raised input keys 440 and corresponding keys 460 of a keyboard 465. The raised input keys 440 may include raised keys 140 with key surfaces 150 as described herein, with each raised key 140 being integrally formed on the key 460 of the keyboard 465. The raised input keys 440 may be centrally formed and positioned on the keys 460 of the keyboard 465. One or more raised keys 140 may include a base collar 130 and base collar edge 135 as described herein. The base 410 of the keyboard attachment 400 may include fasteners, screws, or a mechanical means, for example, one or more fasteners 415, screws 416, tabs, or the like for securing the base 410 to a keyboard PCB of a computing device and an electrical means, for example, connector 470, for connecting the keyboard attachment 400 to the keyboard PCB of the computing device. In some embodiments, the connector 470 may be positioned on a side or underneath the keyboard 465. In some embodiments, the raised input keys 440 may be configured to include touch sensors to allow users to lightly touch or press on the key 460 to effectuate a keypress.

Modified Keyboard

Figure 5:
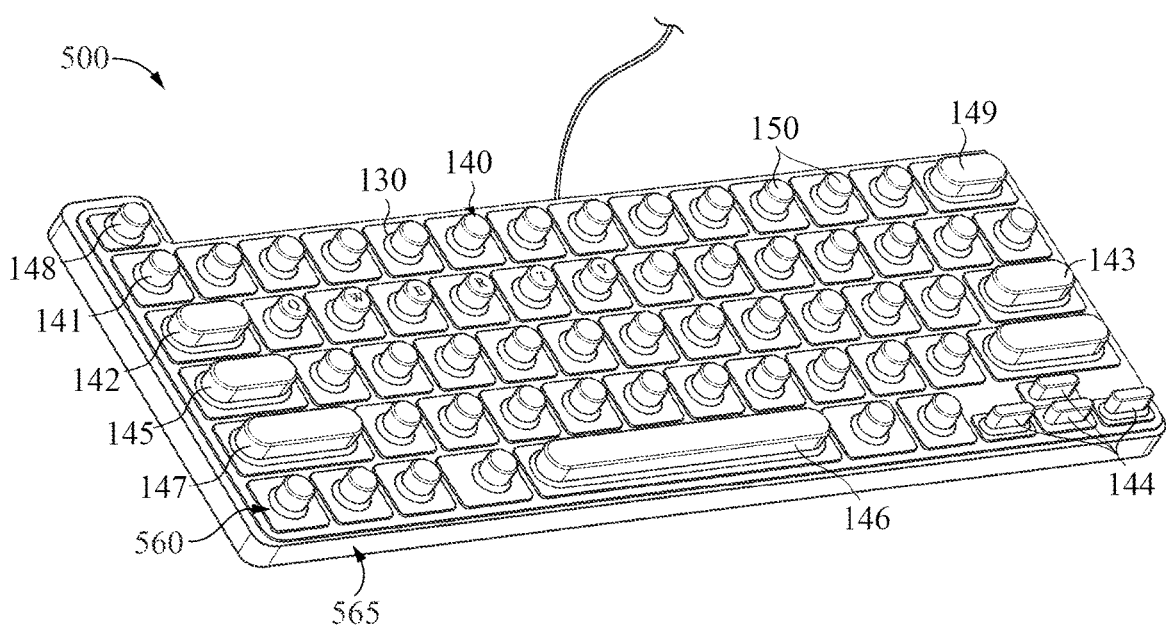
FIG. 5 illustrates a perspective view of one embodiment of a tactile input device.

With reference to FIG. 5, one embodiment of a tactile input device is illustrated that configured for communicatively coupling to a computing device, for example, a laptop or personal computer. In one embodiment, the keyboard device 500 may include a plurality of raised keys 140, each of the raised keys 140 integrally formed on a corresponding key 560 of the keyboard device 565. Each of the one or more raised keys 140 may include a key surface 150, a base collar 130, and a base collar edge 135 as described herein. The raised keys 140 may be centrally formed and positioned on the keys 560 of the keyboard device 565. In some embodiments, the raised keys 140 may be configured to include touch sensors to allow users to lightly touch or press on the key 560 to effectuate a keypress. The keyboard device 500 may include circuitry and components for a wireless (e.g., Bluetooth™, RF, Wi-Fi™, etc.) or wired connection to the computing device.

Modified Input Keys

With reference to FIG. 6, a cross sectional view of various embodiments for a tactile input key profile are illustrated that may be used with the example covers, attachments, and/or devices disclosed. The raised keys may have any vertical profile, size, or shape as desired. Similarly, the raised key surfaces may be modified to facilitate the vertical profile and layout of the raised keys on the operator's side of the modified tactile input device. As shown in FIG. 6, raised keys 140 may be configured to have a key profile 158, where each raised key 140 may be configured to have a slanted vertical structure 151, a curved vertical structure 152, or a set of contoured vertical structures 153. Moreover, each key surface 150 may be configured to be flat, concave, beveled, or slanted. The raised keys 140 and key surfaces 150 may be configured to facilitate speed, accuracy, and comfortable for users of varying finger or hand arches. Moreover, one or more raised keys 140 may be configured to include a wider base, narrower top, and smooth contoured key surface 150 as shown in the contour key 154. The contour keys 154 and other raised key surface 150 profiles may facilitate tactile sensation and comfort for many users. Various embodiments, shapes, textures, surface contours, touch sensors, and configurations for raised keys described herein may be implemented to allow users to comfortably type with the natural curvature of their finger or hand without needing short nails or stiff fingers. Moreover, the raised keys 140 may be configured as desired to provide comfort and accuracy for users with hand or wrist sensitivity, pain, or health conditions such as arthritis and carpal tunnel syndrome that would otherwise be compelled to alter their finger and hand position or hand arch which would make it difficult or painful for them to type for an extended period.

Method for Creating Modified Cover, Keyboard and Keyboard Attachment

FIG. 7 illustrates one embodiment of a method for forming a tactile input attachment that may be used with the example attachments and/or devices disclosed. The method may include various steps for forming a cover, attachment, or input devices with raised keys as disclosed herein. Each block shown in FIG. 7 may represent one or more processes, methods, or subroutines, carried out in the exemplary method. For explanatory purposes, method 700 will be described with reference to FIGS. 1-6 which show example embodiments of carrying out the method of FIG. 7 for forming raised keys on tactile input device covers, attachments, and standalone input devices. Method 700 may be used independently or in combination with other methods or processes for forming raised keys on tactile input device covers, attachments, and standalone input devices.

Method 700 begins at block 710, one or more vertical structures are formed on a first surface of a substrate, the first surface having one or more keycap regions. Further including, forming each of the one or more vertical structures in each of the one or more keycap regions. In one embodiment, forming the one or more vertical structures may further comprise of forming at least one of the vertical structures to extend vertically in a shape of at least one of: a heart, a fruit, a vegetable, a polygon, a circle, a star, a non-fictional character, a fictional character, a letter, a number, an emoji, a flower, a plant, or any combination thereof. In certain embodiment, forming the one or more vertical structures may further comprise of forming at least one of the vertical structures to be of a different size, shape, color, texture, material, or transparency, and wherein the second surface includes a mechanical means for securing to the PCB of the keyboard and an electrical means for connecting to the PCB of the keyboard. In some embodiments, forming one or more vertical structures may further comprise of forming at least one of the one or more vertical structures to extend at an angle from the first surface of the substrate.

In block 720, one or more surface features are formed on a second surface of the substrate, the second surface having one or more keyplate regions, wherein each of the keyplate regions correspond to each of the keycap regions. Further including, vertically aligning each of the formed one or more keyplate regions with each of a corresponding one or more the keycap regions. In some embodiments, each of the one or more surface features may be configured to overlay a corresponding keypress region of a key of the keyboard to communicate a keypress on the keyboard.

In block 730, one or more surface features including indentations and/or protrusions are formed, wherein each of the surface features is disposed in each of the keyplate regions of the second surface of the substrate. The second surface being opposite to the first surface and comprising one or more keyplate regions. In one embodiment, forming the one or more surface features may further comprise of forming one or more indentations on the second surface of the substrate, each of the indentations being formed in each of the keyplate regions. In certain embodiments, forming the one or more indentations may further comprise of forming indentations that extend into and above the first surface of the substrate. In some embodiments, forming the one or more surface features on the second surface of the substrate may further comprise of forming one or more protrusions, wherein each of the one or more protrusions is disposed in each of the one or more keyplate regions, and wherein the one or more protrusions extend vertically from the second surface to communicate a keypress on the keyboard. In one embodiment, forming surface features may include forming on the device surface one or more protrusions and one or more indentations to secure the keys of the keyboard to the device surface.

Definitions

A "keyboard", "input device", "tactile device", or "tactile input device" as used herein includes, but is not limited to, any tangible device for inputting commands, data, force, feedback, pressure, operations, requests, or signals to a computing device or non-computing device. The modified tactile device of the present disclosure may be implemented in any tactile input device as desired for tactile sensation, recovery, motor skill therapy, or the like.

Definitions and Other Embodiments

In one or more embodiments, the disclosed methods or their equivalents are performed by either: computer hardware configured to perform the method; or computer instructions embodied in a module stored in a non-transitory computer-readable medium where the instructions are configured as an executable algorithm configured to perform the method when executed by at least a processor of a computing device.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C. § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A keyboard cover, comprising:

a first surface and a second surface opposite to the first surface, the first surface having a plurality of keycap regions and the second surface having a plurality of keyplate regions;

wherein the first surface includes an input surface portion between the plurality of keycap regions that is configured to be substantially flat on a keyboard;

wherein each keyplate region of the plurality of keyplate regions vertically aligns with and corresponds to each keycap region of the plurality of the keycap regions;

a plurality of vertical structures disposed on the first surface, each vertical structure of the plurality of vertical structures being disposed in and corresponding to each keycap region of the plurality of keycap regions;

wherein each keyplate region of the plurality of keyplate regions includes and corresponds to each key cover of a plurality of key covers, and a corresponding key cover of a corresponding keyplate region is configured to contact and receive a corresponding key of the keyboard;

wherein the corresponding surface feature key cover of the corresponding keyplate region is wider than a corresponding vertical structure disposed in a corresponding keycap region that corresponds to the corresponding keyplate region; and wherein an upper surface of the corresponding keycap region is configured to be substantially flat and correspondingly aligned with the input surface portion.

2. The keyboard cover of claim 1, further comprising a plurality of indentations arranged on the second surface, each indentation of the plurality of indentations being disposed in and corresponding to each keyplate region of the plurality of keyplate regions, wherein the corresponding key cover of the corresponding keyplate region includes a corresponding indentation.

3. The keyboard cover of claim 2, wherein the corresponding indentation is configured to extend beyond the input surface portion of the first surface and into the corresponding key cover of the corresponding keyplate region to receive the corresponding key of the keyboard.

4. The keyboard cover of claim 1, wherein a corresponding surface feature of the corresponding key cover comprises one or more protrusions in the corresponding keyplate region, wherein the one or more protrusions extend vertically from or horizontally with respect to a base surface portion of the corresponding keyplate region that is opposite to the upper surface of the corresponding keycap region, and wherein the one or more protrusions are configured to form a perimeter of the corresponding key cover to receive the corresponding key of the keyboard.

5. The keyboard cover of claim 1, wherein each vertical structure of the plurality of vertical structures extends vertically in a first shape, wherein the first shape comprises a heart, a fruit, a vegetable, a polygon, a circle, a star, a non-fictional character, or a fictional character, a letter, a number, an emoji, a flower, or a plant, wherein the upper surface of the corresponding keyplate region has a second shape that is different from the first shape of the corresponding vertical structure disposed in the corresponding keycap region that corresponds to the corresponding keyplate region.

6. The keyboard cover of claim 1, wherein the corresponding vertical structure of the plurality of vertical structures comprises a base collar that is proximal to the upper surface of the corresponding keycap region and distal to an input key top surface of the corresponding vertical structure of the corresponding keycap region, wherein the base collar has a different size or shape than at least one other portion of the corresponding keyplate region or the corresponding keycap region that corresponds to the corresponding keyplate region.

7. The keyboard cover of claim 6, wherein the base collar of the corresponding vertical structure of the plurality of vertical structures comprises an angled or contoured edge.

8. The keyboard cover of claim 1, wherein the keyboard cover comprises a flexible material and is configured as a unitary attachment piece, and wherein the second surface is configured to secure to the keyboard.

9. The keyboard cover of claim 1, wherein the corresponding key cover of the corresponding keyplate region is a same width as the upper surface of the corresponding keycap region that corresponds to the corresponding keyplate region; and wherein the upper surface of the corresponding keycap region is substantially rectangular and the corresponding vertical structure disposed in the corresponding keycap region is substantially cylindrical.

10. The keyboard cover of claim 1, wherein the corresponding keycap region that corresponds to the corresponding keyplate region forms a wall that extends from the input surface portion to the upper surface of the corresponding keycap region; and wherein a height of the wall is less than a height of the corresponding vertical structure from the upper surface of the corresponding keycap region to an input key top surface of the corresponding vertical structure.

11. A method of forming a keyboard attachment, the keyboard attachment covering or replacing one or more keys of a keyboard, the method comprising:

forming one or more vertical structures on a first surface of a substrate, the first surface having one or more keycap regions;

wherein a vertical structure of the one or more vertical structures is formed in a keycap region of the one or more keycap regions;

forming one or more surface features on a second surface of the substrate, the second surface being opposite to the first surface and comprising one or more keyplate regions, wherein a keyplate region of the one or more keyplate regions includes a surface feature of the one or more surface features, wherein the keyplate region is formed to vertically align with the keycap region;

wherein the surface feature is configured to overlay a keypress region or facilitate a key press of a key of the keyboard to communicate a keypress on the keyboard;

wherein the keyplate region is wider than the vertical structure formed in the keycap region; and wherein the surface feature is formed to include one or more protrusions that extend vertically from or horizontally with respect to a base surface portion of the keyplate region that is opposite to an upper surface of the keycap region.

12. The method of claim 11, further comprising:

forming one or more key covers that include the one or more surface features by forming one or more indentations on the second surface of the substrate, wherein an indentation of the one or more indentations is formed in the keyplate region.

13. The method of claim 11, wherein forming the one or more vertical structures further comprises forming the vertical structure to extend vertically in a first shape, wherein the first shape comprises a heart, a fruit, a vegetable, a polygon, a circle, a star, a non-fictional character, or a fictional character, a letter, a number, an emoji, a flower, or a plant, wherein the upper surface of the keycap region has a second shape that is different from the first shape of the vertical structure.

14. The method of claim 11, wherein the keyboard attachment is formed from a flexible material and configured as a unitary attachment piece, and wherein the second surface includes at least one of a fastener configured to secure the keyboard attachment to a printed circuit board (PCB) of the keyboard, or a connector configured to connect the keyboard attachment to the PCB of the keyboard, or a keyboard PCB of a computing device, or circuitry proximate thereto for a wireless connection to the computing device.

15. The method of claim 11, wherein forming the vertical structure further comprises forming a base collar with an angled or contoured edge.

16. A keyboard, comprising:

a plurality of keys disposed on a panel, wherein a first set of keys of the plurality of keys includes a first keycap region and a first vertical structure, wherein the first vertical structure extends from a first upper surface of the first keycap region;

wherein a second set of keys of the plurality of keys includes a second keycap region and a second vertical structure, wherein the second vertical structure extends from a second upper surface of the second keycap region;

wherein a width of the second upper surface is different from a width of the first upper surface;

wherein the first vertical structure is disposed in a central region of the first keycap region;

wherein the first vertical structure forms a shaped structure that extends vertically from the first upper surface of the first keycap region;

wherein the first upper surface of the first keycap region is wider than the shaped structure;

wherein a height of a wall of the first keycap region that extends from a base surface portion of the panel to the first upper surface of the first keycap region is less than a height of the shaped structure from the first upper surface of the first keycap region to an input key top surface of the shaped structure.

17. The keyboard of claim 16, wherein the first keycap region and the first vertical structure are integrally formed as a unitary key for the first set of keys of the plurality of keys.

18. The keyboard of claim 16, wherein the shaped structure is in a shape of at least one of: a heart, a fruit, a vegetable, a polygon, a circle, a star, a non-fictional character, or a fictional character, a letter, a number, an emoji, a flower, or a plant.

19. The keyboard of claim 16, further comprising circuitry for a wireless connection to a computing device.

20. The keyboard of claim 16, wherein the first set of keys comprises character keys and the second set of keys comprises shift keys or a space bar key.

* * * * *